US012460157B2

(12) United States Patent
Olson et al.

(10) Patent No.: US 12,460,157 B2
(45) Date of Patent: Nov. 4, 2025

(54) MULTIPURPOSE ACIDIC COMPOSITIONS AND METHODS OF USE

(71) Applicant: ECOLAB USA INC., Saint Paul, MN (US)

(72) Inventors: Erik C. Olson, Saint Paul, MN (US); Hilina Emiru, Saint Paul, MN (US); Derrick Anderson, Saint Paul, MN (US); Kelly Anne Rightmire, Saint Paul, MN (US); Timothy Meier, Saint Paul, MN (US)

(73) Assignee: Ecolab USA Inc., Saint Paul, MN (US)

( * ) Notice: Subject to any disclaimer, the term of this patent is extended or adjusted under 35 U.S.C. 154(b) by 172 days.

(21) Appl. No.: 17/249,793

(22) Filed: Mar. 12, 2021

(65) Prior Publication Data

US 2022/0290071 A1 Sep. 15, 2022

(51) Int. Cl.
*C11D 1/22* (2006.01)
*C11D 1/66* (2006.01)
(Continued)

(52) U.S. Cl.
CPC .............. *C11D 3/0047* (2013.01); *C11D 1/22* (2013.01); *C11D 1/66* (2013.01); *C11D 1/75* (2013.01);
(Continued)

(58) Field of Classification Search
CPC .... C11D 1/66; C11D 1/22; C11D 1/75; C11D 3/33; C11D 3/042; C11D 3/2075; C11D 3/2079
(Continued)

(56) References Cited

U.S. PATENT DOCUMENTS

| | | | |
|---|---|---|---|
| 4,372,788 | A | 2/1983 | Lancz |
| 4,414,128 | A | 11/1983 | Goffinet |

(Continued)

FOREIGN PATENT DOCUMENTS

| | | | |
|---|---|---|---|
| CA | 3126090 | A1 | 9/2020 |
| EP | 0379093 | A1 | 7/1990 |

(Continued)

OTHER PUBLICATIONS

"JCW Spotlight on . . . Surfactants", Japan Chemical Week, 2 pages, Apr. 20, 1998.

(Continued)

*Primary Examiner* — Gregory R Delcotto
(74) *Attorney, Agent, or Firm* — McKee, Voorhees & Sease, PLC

(57) ABSTRACT

Multipurpose acidic compositions for cleaning and/or sanitizing are provided. The acidic compositions are liquids that remove polymerized soils, hard water deposit (e.g., calcium carbonate), soap scum, rust and other stains (e.g., coffee and tea), including assisting in general cleaning of difficult soils, such as fats, oils, cosmetics, and other difficult soils. The acidic compositions can include at least one organic acid and a solvent or solvent system, and if desired, can be PPE free compositions. Methods for using the acidic compositions as pre-treatments, soaks and/or application in machine and manual warewash are also provided. Methods for using the acidic compositions for removing polymerized oils, carbonized soils, fats, oils, stains (e.g., coffee and tea), hard water scale/deposits, and cosmetics are also provided.

12 Claims, 10 Drawing Sheets
(5 of 10 Drawing Sheet(s) Filed in Color)

(51) Int. Cl.

| | |
|---|---|
| ***C11D 1/75*** | (2006.01) |
| ***C11D 3/00*** | (2006.01) |
| ***C11D 3/04*** | (2006.01) |
| ***C11D 3/16*** | (2006.01) |
| ***C11D 3/20*** | (2006.01) |
| ***C11D 3/33*** | (2006.01) |
| ***C11D 3/43*** | (2006.01) |

(52) U.S. Cl.
CPC ............ *C11D 3/042* (2013.01); *C11D 3/2075* (2013.01); *C11D 3/2079* (2013.01); *C11D 3/2082* (2013.01); *C11D 3/33* (2013.01); *C11D 3/43* (2013.01); *C11D 2111/14* (2024.01)

(58) Field of Classification Search
USPC ................ 510/235, 238, 477, 488, 505, 506
See application file for complete search history.

(56) References Cited

U.S. PATENT DOCUMENTS

| | | | | |
|---|---|---|---|---|
| 4,557,853 | A † | 12/1985 | Collins | |
| 5,076,955 | A | 12/1991 | Ussat et al. | |
| 5,080,822 | A | 1/1992 | VanEenam | |
| 5,080,831 | A | 1/1992 | VanEenam | |
| 5,158,710 | A | 10/1992 | VanEenam | |
| 5,254,290 | A | 10/1993 | Blandiaux et al. | |
| 5,362,422 | A | 11/1994 | Masters | |
| 5,435,935 | A | 7/1995 | Kupneski | |
| 5,531,933 | A | 7/1996 | Masters et al. | |
| 5,540,865 | A | 7/1996 | Michael | |
| 5,585,341 | A | 12/1996 | Van Eenam | |
| 5,612,308 | A † | 3/1997 | Woo | |
| 5,783,538 | A | 7/1998 | Totoki | |
| 5,786,319 | A | 7/1998 | Pedersen et al. | |
| 5,849,682 | A | 12/1998 | Van Eenam | |
| 5,872,088 | A | 2/1999 | Pucci et al. | |
| 5,922,665 | A | 7/1999 | Liu | |
| 5,977,042 | A | 11/1999 | Hernandez et al. | |
| 6,184,188 | B1 | 2/2001 | Severns et al. | |
| 6,277,805 | B1 | 8/2001 | Kupneski | |
| 6,423,677 | B1 | 7/2002 | Van Eenam | |
| 6,506,717 | B1 | 1/2003 | Kott et al. | |
| 6,537,957 | B1 | 3/2003 | Cardola et al. | |
| 6,544,942 | B1 | 4/2003 | Smith et al. | |
| 6,699,825 | B2 | 3/2004 | Rees et al. | |
| 6,723,692 | B2 | 4/2004 | Foley et al. | |
| 6,784,148 | B2 | 8/2004 | Tadrowski et al. | |
| 6,916,773 | B2 | 7/2005 | Griese et al. | |
| 6,929,702 | B1 | 8/2005 | Motsenbocker | |
| 7,053,037 | B2 | 5/2006 | Smith et al. | |
| 8,329,630 | B2 | 12/2012 | Finison et al. | |
| 8,383,569 | B2 | 2/2013 | Schwerter et al. | |
| 8,420,587 | B2 | 4/2013 | Cermenati et al. | |
| 8,901,059 | B2 | 12/2014 | Evers et al. | |
| 8,969,282 | B2 | 3/2015 | Heisig et al. | |
| 8,999,400 | B2 † | 4/2015 | Ramirez | |
| 9,023,782 | B2 | 5/2015 | Peitersen et al. | |
| 9,103,038 | B2 | 8/2015 | Mohs et al. | |
| 9,233,180 | B2 † | 1/2016 | Omidbakhsh | |
| 9,994,798 | B2 | 6/2018 | Peitersen et al. | |
| 2002/0082185 | A1 | 6/2002 | Totoki | |
| 2003/0125226 | A1 | 7/2003 | Lewis | |
| 2004/0067866 | A1 | 4/2004 | Griese et al. | |
| 2006/0079435 | A1 | 4/2006 | Bigorra Llosas et al. | |
| 2006/0105931 | A1 | 5/2006 | Shi et al. | |
| 2006/0112972 | A1 | 6/2006 | Peitersen et al. | |
| 2006/0113506 | A1 | 6/2006 | Man et al. | |
| 2006/0166845 | A1 | 7/2006 | Terada | |
| 2006/0234890 | A1 | 10/2006 | Griese et al. | |
| 2007/0087952 | A1 | 4/2007 | Hei et al. | |
| 2007/0095003 | A1 | 5/2007 | Hei et al. | |
| 2008/0230095 | A1 | 9/2008 | McKechnie | |
| 2009/0093390 | A1 | 4/2009 | Gross et al. | |
| 2009/0226541 | A1 | 9/2009 | Scholz et al. | |
| 2009/0264329 | A1 | 10/2009 | Underwood et al. | |
| 2010/0010284 | A1 | 1/2010 | Proudlock et al. | |
| 2010/0305014 | A1 | 12/2010 | Miralles et al. | |
| 2010/0317559 | A1 | 12/2010 | Ryther et al. | |
| 2010/0317560 | A1 | 12/2010 | Ryther et al. | |
| 2010/0327560 | A1 | 12/2010 | Silva | |
| 2011/0190187 | A1 | 8/2011 | Hawest, III et al. | |
| 2011/0212866 | A1 | 9/2011 | Rao et al. | |
| 2012/0148751 | A1 | 6/2012 | Herdt et al. | |
| 2012/0204916 | A1 | 8/2012 | Laser et al. | |
| 2013/0196893 | A1 | 8/2013 | Busby | |
| 2015/0203791 | A1 | 7/2015 | Peitersen et al. | |
| 2017/0172145 | A1 | 6/2017 | Sherry et al. | |
| 2017/0335254 | A1 * | 11/2017 | Man | B08B 1/143 |
| 2018/0066213 | A1 | 3/2018 | Lo et al. | |
| 2019/0169550 | A1 | 6/2019 | Hunt, Jr. et al. | |
| 2019/0241839 | A1 | 8/2019 | Flugge-Berendes et al. | |
| 2019/0330567 | A1 | 10/2019 | Ceulemans et al. | |
| 2019/0330573 | A1 | 10/2019 | Man et al. | |
| 2019/0359915 | A1 | 11/2019 | Holland et al. | |
| 2020/0131453 | A1 | 4/2020 | Dahlquist Howlett et al. | |
| 2020/0245615 | A1 | 8/2020 | Ahmadpour | |
| 2020/0325416 | A1 * | 10/2020 | Bakken | C11D 1/143 |
| 2022/0183297 | A1 | 6/2022 | Bentley et al. | |

FOREIGN PATENT DOCUMENTS

| | | | | |
|---|---|---|---|---|
| EP | 0637629 | A1 | 2/1995 | |
| EP | 0875552 | A1 | 11/1998 | |
| EP | 1294839 | B1 | 3/2003 | |
| EP | 2880074 | B1 | 6/2015 | |
| EP | 3118300 | A1 * | 1/2017 | C11D 1/002 |
| GB | 1120470 | | 7/1968 | |
| JP | 2289697 | A | 11/1990 | |
| JP | 812992 | A | 1/1996 | |
| JP | H0892042 | A | 4/1996 | |
| JP | 8165498 | A | 6/1996 | |
| JP | 959677 | A | 3/1997 | |
| JP | 2004143251 | A | 5/2004 | |
| JP | 2004204055 | A | 7/2004 | |
| KR | 1020090114734 | A | 11/2009 | |
| WO | 1995014757 | A2 | 6/1995 | |
| WO | 9818894 | A1 | 5/1998 | |
| WO | 0018864 | A1 | 4/2000 | |
| WO | 0042147 | A1 | 7/2000 | |
| WO | 0190291 | A1 | 11/2001 | |
| WO | 2006115658 | A1 | 11/2006 | |
| WO | 2007002478 | A2 | 1/2007 | |
| WO | 2010073067 | A1 | 7/2010 | |
| WO | 2010136478 | A2 | 12/2010 | |
| WO | 2010138907 | A1 | 12/2010 | |
| WO | 2010146544 | A2 | 12/2010 | |
| WO | 2011126452 | A1 | 10/2011 | |
| WO | 2012166902 | A1 | 12/2012 | |
| WO | 2017112425 | A1 | 6/2017 | |
| WO | WO-2018039603 | A1 * | 3/2018 | B08B 3/08 |
| WO | 2019083643 | A1 | 5/2019 | |
| WO | 2020/161648 | † | 8/2020 | |

OTHER PUBLICATIONS

Li et al., "Development of the formula of heavy-duty kitchen cleaner", Detergent & Cosmetics, vol. 38, No. 9, pp. 46-48, Sep. 1, 2015.

International Searching Authority in connection with PCT/US2021/060265 filed Nov. 22, 2021, "The International Search Report and the Written Opinion of the International Searching Authority, or the Declaration", 14 pages, mailed Mar. 10, 2022.

International Searching Authority in connection with PCT/US2021/060268 filed Nov. 22, 2021, "The International Search Report and the Written Opinion of the International Searching Authority, or the Declaration", 12 pages, mailed Mar. 9, 2022.

"Benzyl Alcohol Paint Stripping," Joint Service Pollution Prevention Opportunity Handbook, Revised Aug. 2001, 4 pages.

Cui et al., "Intermediate Painting Technology: Applicable to Intermediate Painters," State Machinery Industry Commission, Dec. 1988, 2 pages.

(56) References Cited

OTHER PUBLICATIONS

Li et al., "Questions and Answers on Continuous Hot-dip Galvanizing of Strip Steel," Metallurgical Industry Press, Jan. 2011, 2 pages.

* cited by examiner
† cited by third party

Formic Acid

Citric Acid

Gluconic Acid

Formic Acid

Citric Acid

Gluconic Acid

Formic Acid

Citric Acid

Acidic Control

Alkaline Control

Water

Pre-wash
Post-wash 1 minute
Vertical
No foam
2 minute
horizontal
w/ Foam

MULTIPURPOSE ACIDIC COMPOSITIONS AND METHODS OF USE

CROSS REFERENCE TO RELATED APPLICATIONS

This application claims priority under 35 U.S.C. § 119 to U.S. Provisional Application Ser. No. 63/198,956, filed Nov. 25, 2020, which is herein incorporated by reference in its entirety including without limitation, the specification, claims, and abstract as well as any figures, tables, or examples thereof.

This application is also related to U.S. patent application Ser. No. 17/249,784, entitled Multipurpose Alkaline Compositions and Methods of Use, filed concurrently herewith. The entire contents of this patent application are hereby expressly incorporated herein by reference, including without limitation, the specification, claims, and abstract, as well as any figures, tables, or drawings thereof.

FIELD OF THE INVENTION

The invention relates to multipurpose acidic compositions for cleaning, including de-greasing, de-staining, and/or de-liming, and/or sanitizing. The acidic compositions are liquids are suitable for use as pre-sprays (i.e., spot treatment) to beneficially remove polymerized soils, remove hard water deposit (e.g., calcium carbonate), soap scum, rust and other stains (e.g., coffee and tea), including assisting in general cleaning of difficult soils, such as fats, oils, cosmetics, and other difficult soils. The acidic compositions can be used for pre-treatments for machine and manual warewash in order to enhance performance of general-purpose products without the inclusion of costly additives in conventional specialty detergents. The acidic compositions can include at least one organic acid and a solvent or solvent system. If desired, the acidic compositions can be PPE free compositions. Methods for using the acidic compositions as pre-treatments, soaks and/or application in machine and manual warewash are also provided. Methods for using the acidic compositions for removing polymerized oils, carbonized soils, baked on soils, fats, oils, stains (e.g., coffee and tea), hard water scale/deposits, and cosmetics are also provided.

BACKGROUND OF THE INVENTION

Acidic cleaning compositions are often used for hard water and mineral deposit removal, grout and tile cleaning, and the like. The acidic cleaning compositions generally attach and dissolve stains by breaking them down for removal. Acidic compositions are not generally used for general purpose cleaning or removal difficult soils such as polymerized soils. Instead, specialty alkaline detergents are more commonly formulated with specialty additives for treating these types of soils. Formulations containing these specialty additives are costly. They are also not needed for all markets and types of cleaning, degreasing, de-staining, de-liming and/or sanitizing. As a result, often specialty cleaning compositions or formulation to include certain specialty additives are not needed for all applications and/or markets.

There is use of acidic and alkaline compositions for use as paint strippers, for example benzyl alcohol and acids having a pH of about 2.5. However, it is more effective and common for alkaline paint strippers to be used at a pH higher than 7.0 with a neutralized acid or alkaline source, a solvent, and a detergent. These paint strippers are used to remove old coatings that are difficult to remove by other methods. The use of acidic paint removers is known to work slowly to remove paints, often requiring contact overnight or for extended periods of time. These formulations require hazardous use precautions as well as they can be hazardous to health and safety.

It is therefore an object of this disclosure to provide a multipurpose acidic composition combining acids and solvents that can be used as a pre-spray or spot treatment composition to remove difficult soils, including polymerized soils, de-stain, remove hard water deposits, remove soap scum, remove rust, and assist in general cleaning of other difficult soils and stains, including coffee and tea.

It is a further object of the disclosure to provide a multipurpose acidic composition that aids in general purpose cleaning of fats, oils, cosmetics, and other common institutional soils.

It is a further object of the disclosure to provide a multipurpose acidic composition that can be used as a pre-treatment for machine and manual warewash to enhance or boost performance of general-purpose products, thereby reducing the use of specialty additives in detergent compositions.

It is another object of this disclosure to formulate multipurpose acidic compositions that are PPE free products.

It is another object of this disclosure to formulate multipurpose acidic compositions that remove challenging soils including tea stains, coffee stains, hard water scale/deposits, polymerized oils, carbonized soils, baked on soils, fats, oils, cosmetics, and others.

Other objects, aspects and advantages of this invention will be apparent to one skilled in the art in view of the following disclosure, the drawings, and the appended claims.

SUMMARY OF THE INVENTION

The present disclosure relates to multipurpose acidic cleaning compositions and uses thereof. In an embodiment, the composition comprises from about 1 wt-% to about 50 wt-% of at least one acid source; from about 1 wt-% to about 50 wt-% surfactant; and from about 1 wt-% to about 50 wt-% solvent or solvent system; wherein a use solution of the composition has a pH between about 1 and about 5. The compositions provide efficacy as multipurpose cleaning and degreasing formulations that penetrate soils with the acidic formulations, namely pH less than about 6, and preferably between about 1 and about 5.

In an embodiment, a method of cleaning and/or degreasing is provided. The method comprises: applying to a surface or object in need of cleaning and/or degreasing the acidic composition according to the disclosure herein, and removing soils, stains, and/or hard water deposits from the surface or object. In an embodiment, the applying to the surface or object is a multipurpose spot treatment, wherein the cleaning benefits are degreasing, de-liming and de-staining.

While multiple embodiments are disclosed, still other embodiments will become apparent to those skilled in the art from the following detailed description, which shows and describes illustrative embodiments. Accordingly, the drawings and detailed description are to be regarded as illustrative in nature and not restrictive.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 1A:
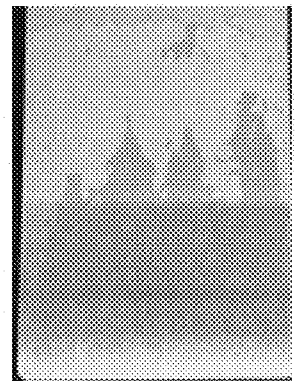
FIGS. 1A-1C show photographs of a drop test using Acidic Compositions containing formic acid (FIG. 1A), citric acid (FIG. 1B), and gluconic acid (FIG. 1C) on stainless steel coupons for efficacy in speed to penetrate and remove corn oil soil on the coupons as described in Example 1.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

The embodiments are not limited to particular acidic compositions and methods of using the same, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers within the defined range. Throughout this disclosure, various aspects are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range (e.g., 1 to 5 includes 1, 1.5, 2, 2.75, 3, 3.80, 4, and 5).

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments without undue experimentation, but the preferred materials and methods are described herein. In describing and claiming the embodiments, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "cleaning" refers to a method used to facilitate or aid in soil removal, bleaching, microbial population reduction, and any combination thereof.

As used herein, the term "free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "hard surface" refers to a solid, substantially non-flexible surface such as a countertop, tile, floor, wall, panel, window, plumbing fixture, kitchen and bathroom furniture, appliance, engine, circuit board, and dish. Hard surfaces may include for example, health care surfaces, food processing surfaces, bathroom surfaces, and the like, and may be interior or exterior.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both, when using the substitute cleaning product or substitute cleaning system to address a typical soiling condition on a typical substrate as described herein. This degree of cleanliness may, depending on the particular cleaning product and particular substrate, correspond to a general absence of visible soils, or to some lesser degree of cleanliness.

The term "surfactant" or "surface active agent" refers to an organic chemical that when added to a liquid change the properties of that liquid at a surface.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions may comprise, consist essentially of, or consist of the components and ingredients as well as other ingredients described herein. As used herein, "consisting essentially of" means that the methods and compositions may include additional steps, components, or ingredients, but only if the additional steps, components or ingredients do not materially alter the basic and novel characteristics of the claimed methods and compositions.

Multipurpose Acidic Compositions

The multipurpose acidic compositions include at least one acid, surfactant(s), a solvent and/or solvent system, and water. The multipurpose alkaline compositions can include additional functional ingredients and can be provided as concentrate or use compositions. Exemplary multipurpose acidic compositions are shown in Table 1 in weight percentage. The compositions are provided as concentrate compositions that can be used for pre-treatment, such as for direct application to a soil, or can be further diluted in a cleaning and/or sanitizing application. The multipurpose acidic compositions are beneficially formulated as concentrates (e.g., First Exemplary Range) or can be further diluted to a use concentrate or ready-to-use (RTU) formulation (e.g., Third Exemplary Range).

TABLE 1

| Material | First Exemplary Range wt.-% | Second Exemplary Range wt.-% | Third Exemplary Range wt.-% |
|---|---|---|---|
| Acid source(s) | 1-50 | 1-25 | 1-10 |
| Surfactant(s) | 1-50 | 1-20 | 1-5 |
| Solvent and/or Solvent System | 1-50 | 1-20 | 1-20 |
| Water | 10-90 | 20-90 | 40-90 |
| Additional Functional Ingredients | 0-50 | 0-25 | 0-20 |
| Total | 100 | 100 | 100 |

According to embodiments the pH of the multipurpose acidic compositions use solution is less than about 7, between about 1 to about 7, between about 2 to about 7, between about 2.5 to about 7, and preferably less than about 6. According to preferred embodiments the pH of the multipurpose acidic compositions use solution is less than about 6, or less than about 5, between about 1 to about 5, between about 1 to about 4, between about 2.5 to about 4, or between about 3 to about 4. The multipurpose acidic compositions provide significant safety benefits as a result of the pH above about 2.5 and/or between about 3 to about 4, including the formulations not requiring personal protective equipment (PPE) for safe handling, while providing substantially similar cleaning efficacy, and in many embodiments superior cleaning efficacy to traditional acidic compositions, as well as providing additional cleaning and/or sanitizing benefits. In other aspects, the multipurpose acidic compositions provide superior degreasing efficacy, along with stain removal (e.g., difficult to remove stains such as tea, coffee, and the like), calcium carbonate and soap scum removal, rust removal, and aiding in further general-purpose cleaning of fats, oils, cosmetics and other difficult to remove soils.

In some embodiments, the wt-ratio of the solvent or solvent system to the acid source is about 1:1. In other embodiments, the wt-ratio of the solvent or solvent system to the acid source is from about 4:1 to about 1:4 to provide beneficial effects in removing difficult soils, such as polymerized corn oil.

Acid Source

The multipurpose acidic compositions include at least one acid source. Acid sources can include organic acids, inorganic acid or a mixture thereof. Examples of acid sources include, for example, citric acid, formic acid, glycolic acid, gluconic acid, phosphoric acid, hydrochloric acid, sulfuric acid, nitric acid, acetic acid or peroxycarboxylic acids. In an embodiment one or more organic acids are included as the acid source, including for example lactic acid, gluconic acid, formic acid, citric acid, acetic acid, oxalic acid, uric acid, malic acid, tartaric acid, or the like. A variety of acids can be formulated into the multipurpose acidic compositions to provide a desired pH for the compositions.

In some embodiments, the concentrate multipurpose alkaline compositions comprise about 1 wt-% to about 50 wt-%, from about 1 wt-% to about 50 wt-%, from about 1 wt-% to about 30 wt-%, from about 1 wt-% to about 25 wt-%, from about 5 wt-% to about 25 wt-%, from about 5 wt-% to about 20 wt-%, or from about 5 wt-% to about 15 wt-% of the at least one acid source. It is to be understood that all values and ranges between these values and ranges are encompassed by the present invention as well as dilutions of the concentrate.

Surfactants

The multipurpose acidic compositions include at least one surfactant. Suitable surfactants can include anionic, cationic, amphoteric, zwitterionic, and/or nonionic surfactants. The emulsifying properties of surfactants can be used for both a concentrate that can be diluted to create a usable cleaning and/or sanitizing product (use dilution) and the use dilution itself. The surfactant or mixture of surfactants can have foaming or defoaming characteristics suitable for a desired cleaning and/or sanitizing application. The surfactant or surfactant system can be selected depending upon the particular soil, e.g., polymerized soil, that is to be removed.

Anionic surfactants suitable for use with the multipurpose alkaline compositions include alkylbenzene sulfonates, such as linear alkylbenzene sulfonates, alkyl carboxylates, paraffin sulfonates and secondary n-alkane sulfonates, sulfosuccinate esters and sulfated linear alcohols. Additional sulfonated anionics include alkyl sulfonates or disulfonates, alkyl aryl sulfonates, alkyl naphthalene sulfonates, alkyl diphenyl oxide disulfonates, and the like. In an embodiment linear alkylbenzene sulfonates (LAS) or linear alkylbenzene sulfonic acids (LABSA) are preferred as the anionic surfactant.

Zwitterionic or amphoteric surfactants suitable for use with the multipurpose alkaline compositions include beta-N-alkylaminopropionic acids, n-alkyl-beta-iminodipropionic acids, imidazoline carboxylates, n-alky-betaines, amine oxides, sulfobetaines and sultaines.

Nonionic surfactants suitable for use with the multipurpose alkaline compositions include alcohol alkoxylates having EO, PO and BO blocks, fatty acid alkoxylate, alkyl phenol alkoxylates, and polyether (also known as polyalkylene oxide, polyoxyalkylene or polyalkylene glycol) compounds. More particularly, the polyether compounds are generally polyoxypropylene or polyoxyethylene glycol compounds. Typically, the surfactants suitable for use with the multipurpose alkaline compositions are synthetic organic polyoxypropylene (PO)-polyoxyethylene (EO) block copolymers. These surfactants have a diblock polymer comprising an EO block and a PO block, a center block of polyoxypropylene units (PO), and having blocks of polyoxyethylene grated onto the polyoxypropylene unit or a center block of EO with attached PO blocks.

Cationic surfactants suitable for use with the multipurpose alkaline compositions can include alkylamines and their salts, alkyl imidazolines, ethoxylated amines, and quaternaries, such as alkylbenzyldimethylammonium salts, alkyl benzene salts, heterocyclic ammonium salts, tetra alkylammonium salts, and the like. Cationics further include compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced, or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom. Additional description can be in "Surfactant Encyclopedia", Cosmetics & Toiletries, Vol. 104 (2) 86-96 (1989) and U.S. Pat. No. 9,663,431, which are herein incorporated by reference in its entirety.

Amphoteric surfactants suitable for use with the multipurpose alkaline compositions include derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" Cosmetics & Toiletries, Vol. 104 (2) 69-71 (1989) and U.S. Pat. No. 9,663,431, which are herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Surfactants that can be used include anionic, cationic, amphoteric, zwitterionic, and/or nonionic surfactants, which are commercially available from a number of sources. For a discussion of surfactants, see Kirk-Othmer, Encyclopedia of Chemical Technology, Third Edition, volume 8, pages 900-912. Surfactants can be used alone or in combination. In an embodiment, nonionics and anionics are used in combination. The semi-polar nonionic, cationic, amphoteric and zwitterionic surfactants can be employed in combination with nonionics or anionics. The above examples are merely specific illustrations of the numerous surfactants which can find application within the scope of the multipurpose alkaline compositions. It should be understood that the selection of particular surfactants or combinations of surfactants can be based on a number of factors including compatibility with the surface to be cleaned at the intended use concentration and the intended environmental conditions including temperature and pH.

In a preferred embodiment, the surfactant is an anionic alkylbenzene sulfonate. In an embodiment, the surfactant is a linear alkyl benzene sulfonate and is combined with the solvent (e.g., benzyl alcohol) for a preferred acidic composition.

In some embodiments, the multipurpose acidic compositions comprise from about 1 wt-% to about 50 wt-%, from about 1 wt-% to about 40 wt-%, from about 1 wt-% to about 30 wt-%, from about 1% to about 20 wt-% of surfactant, from about 1% to about 10 wt-% of surfactant or from about 1% to about 5 wt-% of surfactant. It is to be understood that all values and ranges between these values and ranges are encompassed by the present invention.

Solvents and Solvent Systems

The multipurpose acidic compositions include at least one solvent or a solvent system. In various embodiments, the multipurpose acidic compositions may include a solvent that also functions as a cleaning agent. The solvent or solvent system can be used for enhancing the cleaning properties of the multipurpose acidic composition as well as to provide emulsifying properties of a given composition. For example, the solvent system may keep hydrophilic and hydrophobic components of the specific composition from separating. The emulsifying properties can be used for both a concentrate that can be diluted to create a usable cleaning product (use solution) and the use dilution itself.

Exemplary solvents and solvent systems may include one or more different solvents including aromatic alcohols, alkanol amines, ether amines, glycol ethers, esters and mixtures thereof. Representative solvents may include acetamidophenol, acetanilide, acetophenone, 2-acetyl-1-methylpyrrole, benzyl acetate, benzyl alcohol, methyl benzyl alcohol, alpha phenyl ethanol, benzyl benzoate, benzyloxyethanol, ethylene glycol phenyl ether (commercially available as "DOWANOL EPh" from Dow Chemical Co.), propylene glycol phenyl ether (commercially available as "DOWANOL PPh" from Dow Chemical Co.), amyl acetate, amyl alcohol, butanol, 3-butoxyethyl-2-propanol, butyl acetate, n-butyl propionate, cyclohexanone, diacetone alcohol, diethoxyethanol, diethylene glycol methyl ether, diisobutyl carbinol, diisobutyl ketone, dimethyl heptanol, dipropylene glycol tert-butyl ether, ethanol, ethyl acetate, 2-ethylhexanol, ethyl propionate, ethylene glycol methyl ether acetate, hexanol, isobutanol, isobutyl acetate, isobutyl heptyl ketone, isophorone, isopropanol, isopropyl acetate, methanol, methyl amyl alcohol, methyl n-amyl ketone, 2-methyl-1-butanol, methyl ethyl ketone, methyl isobutyl ketone, 1-pentanol, n-pentyl propionate, 1-propanol, n-propyl acetate, n-propyl propionate, propylene glycol ethyl ether, tripropylene glycol methyl ether (commercially available as DOWANOL TPM from Dow Chemical Co.), tripropylene glycol n-butyl ether (commercially available as DOWANOL TPNB from Dow Chemical Co.), diethylene glycol n-butyl ether acetate (commercially available as Butyl CARBITOL acetate from Dow Chemical Co.), diethylene glycol monobutyl ether (commercially available as Butyl CARBITOL from Dow Chemical Co.), ethylene glycol n-butyl ether acetate (commercially available as Butyl CELLOSOLVE acetate from Dow Chemical Co.), ethylene glycol monobutyl ether (commercially available as Butyl CELLOSOLVE from Dow Chemical Co.), dipropylene glycol monobutyl ether (commercially available as Butyl DIPROPASOL from Dow Chemical Co.), propylene glycol monobutyl ether (commercially available as Butyl PROPASOL from Dow Chemical Co.), ethyl 3-ethoxypropionate (commercially available as UCAR Ester EEP from Dow Chemical Co.), 2,2,4-Trimethyl-1,3-Pentanediol Monoisobutyrate (commercially available as UCAR Filmer IBT from Dow Chemical Co.), diethylene glycol monohexyl ether (commercially available as Hexyl CARBITOL from Dow Chemical Co.), ethylene glycol monohexyl ether (commercially available as Hexyl CELLOSOLVE from Dow Chemical Co.), diethylene glycol monomethyl ether (commercially available as Methyl CARBITOL from Dow Chemical Co.), diethylene glycol monoethyl ether (commercially available as CARBITOL from Dow Chemical Co.), ethylene glycol methyl ether acetate (commercially available as Methyl CELLOSOLVE acetate from Dow Chemical Co.), ethylene glycol monomethyl ether (commercially available as Methyl CELLOSOLVE from Dow Chemical Co.), dipropylene glycol monomethyl ether (commercially available as Methyl DIPROPASOL from Dow Chemical Co.), propylene glycol methyl ether acetate (commercially available as Methyl PROPASOL acetate from Dow Chemical Co.), propylene glycol monomethyl ether (commercially available as Methyl PROPASOL from Dow Chemical Co.), diethylene glycol monopropyl ether (commercially available as Propyl CARBITOL from Dow Chemical Co.), ethylene glycol monopropyl ether (commercially available as Propyl CELLOSOLVE from Dow Chemical Co.), dipropylene glycol monopropyl ether (commercially available as Propyl DIPROPASOL from Dow Chemical Co.) and propylene glycol monopropyl ether (commercially available as Propyl PROPASOL from Dow Chemical Co.). Representative dialkyl carbonates include dimethyl carbonate, diethyl carbonate, dipropyl carbonate, diisopropyl carbonate and dibutyl carbonate. Representative oils include benzaldehyde, pinenes (alphas, betas, etc.), terpineols, terpinenes, carvone, cinnamealdehyde, borneol and its esters, citrals, ionenes, jasmine oil, limonene, dipentene, linalool and its esters. Representative dibasic esters include dimethyl adipate, dimethyl succinate, dimethyl glutarate, dimethyl malonate, diethyl adipate, diethyl succinate, diethyl glutarate, dibutyl succinate, dibutyl glutarate and products available under the trade designations DBE, DBE-3, DBE-4, DBE-5, DBE-6, DBE-9, DBE-IB, and DBE-ME from DuPont Nylon. Representative phthalate esters include dibutyl phthalate, diethylhexyl phthalate and diethyl phthalate.

Preferred solvents for wetting of soils, such as difficult to remove soils, such as polymerized non-trans-fat soils, include benzyl alcohol, dibasic esters, essential oils, dialkyl carbonates, ethylene glycol monobutyl ether, diethylene glycol monobutyl ether, ethylene glycol phenyl ether, propylene glycol phenyl ether and mixtures thereof.

According to an embodiment, the solvent or solvent system includes at least one aromatic alcohol (e.g., benzyl alcohols, phenyl alcohols). Preferably the aromatic alcohol solvent system is benzyl alcohol. The solvent may further include solvents in similar limited water solubility range as benzyl alcohol, including for example benzyloxyethanol and/or benzyloxypropanol.

According to a further embodiment, the solvent system may include benzyl acetate, benzyl alcohol, methyl benzyl alcohol, alpha phenyl ethanol, benzyl benzoate, benzyloxyethanol and/or the like. Additional description of solvent systems that may be included in the compositions are disclosed in U.S. Patent Publication No. 2010/0317559, incorporated herein by reference in its entirety.

In some embodiments, the multipurpose acidic compositions include from about 1 wt-% to about 50 wt-%, from about 1 wt-% to about 40 wt-%, from about 1 wt-% to about 30 wt-%, from about 1 wt-% to about 20 wt-%, or from about 1 wt-% to about 20 wt-% of a solvent system. It is to be understood that all values and ranges between these values and ranges are encompassed by the present invention.

Additional Functional Ingredients

The components of the multipurpose acidic compositions can further be combined with various functional components suitable for uses disclosed herein. In some embodiments, the multipurpose acidic compositions including the at least one acid, surfactant(s), solvent and/or solvent system, and water make up a large amount, or even substantially all of the total weight of the compositions. For example, in some embodiments few or no additional functional ingredients are disposed therein.

In other embodiments, additional functional ingredients may be included in the multipurpose acidic compositions. The functional ingredients provide desired properties and functionalities to the compositions. For the purpose of this application, the term “functional ingredient” includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in cleaning. However, other embodiments may include functional ingredients for use in other applications.

In some embodiments, the multipurpose acidic compositions may include hydrotropes or couplers, neutralizing agents, optical brighteners, defoaming agents, antiredeposition agents, bleaching agents, solubility modifiers, buffers, tracers, dispersants, metal protecting agents, soil antiredeposition agents, stabilizing agents, corrosion inhibitors, chelating/sequestrating agents, enzymes, aesthetic enhancing agents including fragrances and/or dyes, additional rheology and/or solubility modifiers or thickeners, buffers, solvents, additional cleaning agents and the like.

In some embodiments, the multipurpose acidic compositions may include one or more of a buffer or pH adjuster (i.e., alkalinity source), dye (i.e., for product safety/identification), fragrance, thickener, corrosion inhibitor and/or enzyme.

In embodiments, the additional ingredients can be preformulated with the multipurpose alkaline compositions or added to the use solution before, after, or substantially simultaneously with the addition of the compositions. Additionally, the compositions can be used in conjunction with one or more conventional cleaning and/or sanitizing agents or compositions.

In preferred embodiments, the composition does not include polysaccharide polymers and a homo/copolymer of vinylpyrrolidone. In preferred embodiments, the composition does not include cationic surfactants. In preferred embodiments, the composition does not include strong acids.

According to embodiments, the various additional functional ingredients may be provided in the compositions in the amount from about 0 wt-% and about 50 wt-%, from about 0 wt-% and about 40 wt-%, from about 0 wt-% and about 30 wt-%, from about 0 wt-% and about 25 wt-%, from about 0 wt-% and about 20 wt-%, 0.1 wt-% and about 50 wt-%, from about 0.1 wt-% and about 40 wt-%, from about 0.1 wt-% and about 30 wt-%, from about 0.1 wt-% and about 25 wt-%, from about 0.1 wt-% and about 20 wt-%, from about 0.1 wt-% and about 10 wt-%, from about 0.1 wt-% and about 5 wt-%, from about 1 wt-% and about 50 wt-%, from about 1 wt-% and about 40 wt-%, from about 1 wt-% and about 30 wt-%, from about 1 wt-% and about 25 wt-%, from about 1 wt-% and about 20 wt-%, from about 1 wt-% and about 10 wt-%, or from about 1 wt-% and about 5 wt-%. In addition, without being limited according to the invention, all ranges recited are inclusive of the numbers defining the range and include each integer within the defined range.

Hydrotropes

The multipurpose acidic compositions can optionally include a hydrotrope as an additional functional ingredient. Hydrotropes aid in compositional stability and aqueous formulation. Functionally speaking, the suitable hydrotrope couplers which can be employed are non-toxic and retain the active ingredients in aqueous solution throughout the temperature range and concentration to which a concentrate or any use solution is exposed. Without being limited to a particular mechanism of action or embodiment, as the multipurpose acidic compositions increase in acid concentration the hydrotrope can be used to increase the pH of the acidic composition to the desired pH range, such as pH between about 2.5 and about 4, or between about 3 and about 4.

Any hydrotrope coupler may be used provided it does not react with the other components of the composition or negatively affect the performance properties of the composition. Representative classes of hydrotropic coupling agents or solubilizers which can be employed include anionic surfactants such as alkyl sulfates and alkane sulfonates, linear alkyl benzene (including linear alkylbenzene sulfonates (LAS)) or naphthalene sulfonates, secondary alkane sulfonates, alkyl ether sulfates or sulfonates, alkyl phosphates or phosphonates, dialkyl sulfosuccinic acid esters, sugar esters (e.g., sorbitan esters), amine oxides (mono-, di-, or tri-alkyl) and C8-C10 alkyl glucosides. Preferred coupling agents include aromatic sulfonates such as the alkyl benzene sulfonates (e.g., xylene sulfonates) or naphthalene sulfonates, aryl or alkaryl phosphate esters or their alkoxylated analogues having 1 to about 40 ethylene, propylene or butylene oxide units or mixtures thereof. Other preferred hydrotropes include nonionic surfactants of C6-C24 alcohol alkoxylates (alkoxylate means ethoxylates, propoxylates, butoxylates, and co-or-terpolymer mixtures thereof) (preferably C6-C14 alcohol alkoxylates) having 1 to about 15 alkylene oxide groups (preferably about 4 to about 10 alkylene oxide groups); C6-C24 alkylphenol alkoxylates (preferably C8-C10 alkylphenol alkoxylates) having 1 to about 15 alkylene oxide groups (preferably about 4 to about 10 alkylene oxide groups); C6-C24 alkylpolyglycosides (preferably C6-C20 alkylpolyglycosides) having 1 to about 15 glycoside groups (preferably about 4 to about 10 glycoside groups); C6-C24 fatty acid ester ethoxylates, propoxylates or glycerides; and C4-C12 mono or dialkanolamides. A preferred hydrotrope is sodium xylene sulfonate (SXS).

In embodiments employing a hydrotrope, the multipurpose acidic compositions include from about 0.1 wt-% to about 20 wt-%, from about 0.1 wt-% to about 10 wt-%, from about 0.5 wt-% to about 10 wt-%, from about 0.5 wt-% to about 8 wt-%, or from about 0.5 wt-% to about 5 wt-% of hydrotrope. It is to be understood that all values and ranges between these values and ranges are encompassed by the present invention.

Use Solutions

According to an embodiment, a use dilution of the concentrate multipurpose acidic compositions can range from a RTU formulation that does not require further dilution to about 1:10 dilution of the concentrate to solvent. Dilution ranges in between are also suitable. More preferably, a use dilution of about 1:3 to about 1:6 is obtained from the concentrate composition. As one skilled in the art will ascertain as a result of the disclosure herein, a use solution can be generated according to the particular needs of a user and its application.

In some embodiments, a dilution step may be initially employed to provide a water source to the concentrated composition suitable for generating a use solution or use composition. In some aspects, the concentrated multipurpose cleaning composition may be diluted at a dilution factor between approximately 1 to about 22 ounces liquid concentrate per gallon of water diluent, from about 1 to about 12 ounces liquid concentrate per gallon of water diluent, or from about 8 to about 10 ounces liquid concentrate per gallon of water diluent. In some aspects, the dilution step occurs at or near a point of use, and may include for example use of a water source that is provided using an aspirator or other dilution mechanism known to the art. In other aspects, when the cleaning composition is employed in a diluted (or a use solution or composition) formulation no further dilution is required by a user.

Methods of Use

The multipurpose acidic compositions are suited for cleaning, sanitizing and/or disinfecting various surfaces and objects. Multipurpose compositions, as the name implies, are intended to be used on multiple types of surfaces and multiple types of soils. The multipurpose acidic compositions are efficacious in cleaning and removing soils from such surfaces and objects, including for example difficult to remove soils, including polymerized soil, carbonized soil, baked on soil, and/or other fat soils. These often include polymerized fat soils, such as polymerized zero trans-fat soils including corn oil. While an understanding of the mechanism is not necessary to practice the methods of use described herein, it is contemplated that, in some embodiments, the solvent or solvent system (e.g., benzyl alcohol) provides a limited water-soluble alcohol providing hydrophobicity that adds affinity towards greasy soils and acts as a plasticizer. The soils, upon contact with the multipurpose acidic compositions, swell and lose adhesion from the substrate, providing a unique cleaning approach in comparison to the use of caustic degreasers and/or other alkaline control compositions.

Beneficially, the multipurpose acidic compositions have a higher pH than traditional acidic compositions while providing substantially similar cleaning efficacy. In embodiments, the compositions have a pH less than about 4. Beneficially, the pH of the composition in use solution is less than about 4, from about 1 to about 4, or from about 2 to about 4. In other embodiments the pH of the compositions in a use solution is from about 2.5 to about 4, or from about 3 to about 4. The compositions provide significant safety benefits as a result of the pH range while providing substantially similar cleaning efficacy, and in many embodiments superior cleaning efficacy to traditional acidic compositions (or even in comparison to traditional alkaline degreasing compositions).

According to preferred embodiments, the compositions having a pH above about 2.5 do not require PPE, while unexpectedly providing the same or substantially similar cleaning efficacy for soil removal as compositions having alkaline pH, such as above about 11.5 and/or compositions including hydroxide (i.e., caustic) alkalinity sources.

The multipurpose acidic compositions act quickly to remove soils, such as polymerized fat soils. The fast penetrating of the soils allows the compositions to be used a pretreatment that does not require extended dwell or pretreatment time. In an embodiment, the compositions achieve degreasing action within about approximately 5 seconds to a few minutes of contact to a soiled surface or object. According to a preferred embodiment, application of the compositions result in soil removal within about seconds without requiring substantial mechanical action or excessive temperatures. The methods result in cleaning efficacy that is at least substantially similar to with the use of a hydroxide-based and corrosive, highly alkaline compositions, demonstrating an unexpected beneficial application of use of the multipurpose acidic compositions. In a further embodiment, the methods of cleaning and/or degreasing result in the compositions penetrating soils more quickly than an alkaline control composition. As referred to herein, an alkaline control composition can include either a hydroxide-based alkaline composition or a non-hydroxide composition including pH above 11.5 and/or requires use of PPE.

The multiuse acidic compositions are particularly well suited for use as a multipurpose de-greasing, de-liming (i.e., hard water spots), and de-staining composition. The de-staining can include removal of difficult stains such as tea and coffee stains. These multipurpose benefits are particularly useful as a multipurpose kitchen spot treatment. Beneficially, such multipurpose benefits provide a single cleaning application instead of formulating detergents to remove stains, polymerized soils (also including carbonized soils and fats), and hard water spots.

In some embodiments, the de-staining of surfaces or objects with the multipurpose acidic composition is achieved within less than about 10 minutes, less than about 5 minutes, less than about 4 minutes, less than about 3 minutes, less than 90 seconds, less than about 60 seconds, less than about 45 seconds, or less than about 30 seconds of contacting time.

In some embodiments, the soil removal of surfaces or objects with the multipurpose acidic composition is achieved within less than about 10 minutes, less than about 5 minutes, less than about 4 minutes, less than about 3 minutes, less than about 2 minutes, less than about 60 seconds, or less than about 45 seconds of contacting time.

Exemplary industries in which the present methods can be used include but are not limited to: food service industry; food and beverage industry; consumer degreasing applications; oil processing industry; industrial agriculture and ethanol processing; and the pharmaceutical manufacturing industry. Suitable use for the compositions and methods of the invention may include, for example, oven cleaner, including microwave ovens, general degreaser, fryer degreaser, smokehouse cleaner, floor cleaner, exhaust hood cleaner, drain cleaner, floor finish remover, floor cleaner, fryer cleaner, pot and pan cleaner, carpet spotter, pharmaceutical and cosmetics cleaner, instrument cleaner, tar remover, and the like.

As a further benefit, the multipurpose acidic compositions are also able to remove other soils from surfaces or objects beyond the polymerized fat soils. In an additional embodiment, the multipurpose acidic compositions can be used in any other methods seeking to remove polymerized soils, stains and/or hard water scaling without requiring the use of hydroxide-based or corrosive formulations, such as removing polymerized or cross-linked films from floors and other finishes. In such an embodiment, methods of use of the composition as a floor stripper and/or floor cleaner may be employed. In an embodiment, methods of use include removing soils from interior and/or exterior floors. In such an embodiment, the floor may be made of various materials including for example concrete, for example outside a drive thru wherein oil and grease soils may be present. In a further embodiment, methods of using the composition as a multipurpose formulation are employed, unexpectedly demonstrating efficacy in non-traditional applications of a non-hydroxide alkalinity composition.

The present methods can also be used to remove soils other than polymerized soils. Such other soils include, but are not limited to, starch, cellulosic fiber, protein, simple carbohydrates, and combinations of any of these soil types with mineral complexes. Examples of specific food soils that are effectively removed using the present methods include, but are not limited to, soils generated in the manufacture and processing meat, poultry, vegetables and fruit, bakery goods, soft drinks, brewing and fermentation residues, soils generated in sugar beet and cane processing and processed foods containing these ingredients and associated ingredients such as juices, sauces, and condiments (e.g., fruit juices, ketchup, tomato sauce, barbeque sauce). These soils can develop on environmental surfaces such as walls and floors, freezers and cooling systems, heat exchange equipment surfaces, conveyor surfaces and on other surfaces during the manufacturing and packaging process.

The multipurpose acidic compositions can be further employed as a bathroom cleaner. It is beneficial in that the multipurpose cleaning capability of the compositions further removes soils that can be found in bathroom applications. For example, hard water deposits, soap scum (e.g., calcium stearate and other soap scum soils) and/or rust can be removed from the surface or object being cleaned with the multipurpose acidic compositions. The compositions can be used to remove stains, soil, hard water and the like from any conventional bathroom surfaces including but not limited to, toilets, shower stalls, racks, curtains, shower doors, bathing appliances, shower bars, bathtubs, bidets, sinks, etc., as well as countertops, walls, floors, etc. Additional hard surfaces which may be cleaned using the compositions, include for example, counter tops, tile, floors, walls, windows, fixtures, kitchen furniture, appliances, and the like. The various hard surfaces suitable for cleaning include for example, glass; metals; plastics e.g., polyester, vinyl; fiberglass, Formica, Conan, refractory materials such as: glazed and unglazed tile, brick, porcelain, ceramics as well as stone including marble, granite, and other stones surfaces; and other hard surfaces known to the industry.

Acidic compositions having a low pH (e.g., below about 3) are particularly well suited for cleaning soap scum, scale (i.e., hard water stains and lime scale as may also be used to refer to such stains commonly found in bathrooms) and/or other residues as is commonly found in bathrooms due to is triprotic acid strength when formulated at pH values less than about 3. The removal of soap scum and scale requires the strength of an acid to effectively clean due to the presence of calcium and magnesium salts and soap residues. Similarly, the acid component is needed to treat hard water stains, which are mineral stains caused by the deposition of salts, such as calcium or magnesium carbonates, frequently present in hard water. Still further, the strength of acidic products are further needed for removing soap scum stains, which include the residues of fatty acid soaps which are often based on alkaline salts of low fatty acids known to precipitate in hard water due to the presence of metal salts therein leaving an undesirable residue upon such surfaces. In an embodiment, it is unexpected that the acidic compositions have a pH higher than those typically used as bathroom cleaners (conventional pH <2.5 or <2). Without being limited to a particular mechanism of action, the combination of the acid, surfactant and solvent or solvent systems provides the benefits in cleaning without requiring lower pH.

The multipurpose acidic compositions can be further employed as an antimicrobial composition. The antimicrobial efficacy can be employed for sanitizing and/or disinfecting cleaning composition. Beneficially, the combination of the one or more acid sources with the anionic surfactant (e.g., LAS) can provide sanitizing benefits. Use for sanitizing provides antimicrobial efficacy against a broad spectrum of microorganisms, providing broad spectrum bactericidal and fungistatic activity. For example, the broad-spectrum activity can include activity against wide range of different types of microorganisms (including both aerobic and anaerobic microorganisms, gram positive and gram negative microorganisms), including bacteria, yeasts, molds, fungi, algae, and other problematic microorganisms. Sanitizing methods can be used to achieve any suitable reduction of the microbial population in and/or on the surface or object, including reducing the microbial population by at least one $\log_{10}$, at least two $\log_{10}$, at least three $\log_{10}$, at least four $\log_{10}$, or at least five $\log_{10}$. Without limiting the scope of invention, the numeric ranges are inclusive of the numbers defining the range and include each integer within the defined range. In some embodiments, the multipurpose acidic compositions are employed at pH (e.g., less than about 4) that sanitizing efficacy is achieved at least at a concentration of about 500 ppm surfactant (e.g., LAS).

In embodiments, the compositions can be used as a concentrate or a use solution.

In embodiments, the compositions can be used as a pretreatment, soak, or spray. The composition or use solutions thereof can be applied using a variety of methods and conventional application techniques, which will vary depending upon the application as a soak, spray, or the like. These methods can operate on an object, surface, or the like, by contacting the object or surface with the composition. Contacting can comprise any of numerous methods for applying a liquid, such as spraying the compound, immersing the object in the compound, foam or gel treating the object with the compound, or a combination thereof. Without being limited to the contacting method, a concentrate or use composition can be applied to or brought into contact with an object or surface by any conventional method or apparatus for applying a liquid composition to an object. For example, the surface can be wiped with, sprayed with, foamed on, and/or immersed in the compositions, or use compositions made from the concentrated compositions. The liquid compositions can be sprayed, foamed, or wiped onto a surface; the compound can be caused to flow over the surface, or the surface can be dipped into the compound. Contacting can be manual or by machine.

A particularly well-suited method for applying or contacting the compositions to a stained or soiled surface is through the use of a manually operated spray-dispensing container. The spray-dispensing container preferably includes a spray nozzle, a dip tube and associated pump dispensing parts, providing convenient application to stained or soiled surfaces or objects.

The various methods include a step of contacting a surface in need of cleaning and/or degreasing with the compositions for a sufficient amount of time such that the composition penetrates into the soil to be removed. The length of time required for soil penetration will depend on the thickness of the soil as well as the relative polymerization level of the soil. In such cases, it is preferable that the composition includes a high foaming surfactant system or a thickening system so that the composition does not dry out and remains hydrated on the surface for an extended period of time.

The multipurpose acidic compositions can be in contact with a surface or object for a sufficient amount of time to clean the surface or object. In an aspect, the surface or object is contacted with the composition for at least about 10 seconds, 30 seconds, 1 minute, at least about 10 minutes, or between about 10 minutes and about 20 minutes. The contact time is also provided at a sufficiently acidic pH to provide the multipurpose efficacy, including at a pH less than about 6, less than about 5, and preferably less than about 4. In still other embodiments the contact time is also provided at a RTU or use concentration of the multipurpose acidic compositions from about 1 wt-% to about 20 wt-%, including all ranges therebetween.

The methods can further optionally include a step of wiping off the treated surface or object with a rag, towel, sponge, or other item (e.g., a disposable paper towel or sponge). In other embodiments this step is not require, as the surface or object may be placed into a washing machine or ware washing machine for further treatment with a detergent composition. In some embodiments involving heavy soil deposits or stains, the composition may be left on the soiled surface until it has effectively loosened the soil deposits or stains, after which it may be wiped off, rinsed off, or otherwise removed. For particularly heavy deposits of such undesired stains, multiple applications may also be used.

The methods can further optionally include using mechanical force during the contacting step. For example, for removing certain soils or stains from the surface or object additional force may need to be applied, e.g., applying a water source and/or mechanical force to assist in removing soils.

The methods can further optionally include a step of rinsing off the treated surface or object with water. In yet other embodiments the composition is wiped off the soiled surface, effectively removing the soils and any remaining composition. In further aspects, there is no need for a rinse step.

The compositions can be applied following a step of heating the composition to a temperature of about 40° F. or above, 40° F. to about 130° F. In other embodiments, the methods provide for soil removal from surfaces or objects at an ambient or room temperature, e.g., about 50° F. to about 100° F. It is preferred in various embodiments that neither the surface or object nor the composition is heated before the contacting step. In still other cases, methods provide for soil removal from surfaces or objects at colder temperature, e.g., about 25° F. to about 50° F. In other cases, the methods may require applying to surfaces or objects that range in temperature from 0° F. to about 200° F.

The compositions and methods described herein beneficially remove stains and/or soils and/or lime (hard water deposits) by at least about 70%, by at least about 80%, and preferably at least about 90% or at least about 95%. Beneficially, the composition and methods described herein provide substantially similar or superior cleaning efficacy compared to hydroxide-based and corrosive, highly alkaline compositions.

In exemplary embodiments, the compositions and methods beneficially remove stains from various surfaces and provide at least about 80% stain removal, and preferably at least about 90% stain removal or at least about 95% stain removal. In still further embodiments, the compositions and methods beneficially remove 100% of stains from the treated surface. These performance benefits exceed those achieved from hydroxide-based and corrosive, highly alkaline compositions.

In further exemplary embodiments, the compositions and methods beneficially remove soils from various surfaces and provide at least about 80% soil removal, and preferably at least about 90% soil removal or at least about 95% soil removal. In still further embodiments, the compositions and methods beneficially remove 100% of soil from the treated surface.

In still further exemplary embodiments, the compositions and methods beneficially remove lime scale (hard water deposits) from various surfaces and provide at least about 70% lime scale removal, at least about 75% lime scale removal, at least about 80% lime scale removal, and preferably at least about 90% lime scale removal from the treated surface.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

The Alkaline Control and Acidic Compositions utilized in the Examples are shown in Table 2-3:

TABLE 2

| | Acidic Control | Formic Acid | Citric Acid | Gluconic Acid |
|---|---|---|---|---|
| Strong acid(s) | 10-15 | | | |
| Organic acid(s) | 5-7 | | 4.5 | |
| Block copolymer surfactant (Plyoxyethylne Plyoxypropylne bl. pol.) | <0.5 | | | |
| Benzyl Alcohol | | 10 | 8 | 8 |
| Anionic surfactant (Dodecyl Benz Sulfonic Acid, 96%) | | 3.5 | 2.5 | 2.5 |
| Formic Acid, 90% | | 5 | | |
| Gluconic Acid | | | | 4.5 |
| SXS, 40% | | | 1 | 1 |
| Dyes | <1 | | | |
| Water Zeolite Softened | Remainder | Remainder | Remainder | Remainder |
| Total wt-% | 100 | 100 | 100 | 100 |

TABLE 3

| Description | Alkaline Control Wt-% |
|---|---|
| Non-hydroxide alkalinity | 1-10 |
| Anionic surfactant | 0.5-5 |
| Solvent | 5-15 |

TABLE 3-continued

| Description | Alkaline Control Wt-% |
|---|---|
| Aminocarboxylate Chelant | 0 |
| Additional functional ingredient | <1 |
| Water Zeolite Softened | Remainder |
| Total wt-% Composition | 100 |

Example 1

An alkaline control formulation (see Alkaline Control in Table 3) used for removing grease stains and polymerized soils, such as corn oil soils, was compared to an Acidic Composition containing a combination of a solvent and an organic acid (see Acidic Composition in Table 2) to assess additional performance benefits. Initial assessment of the Acidic Composition was completed on soiled coupons with polymerized corn oil. Additional testing was completed on tea stains, to determine if the Acidic Composition containing the combination of solvent and an organic acid could expand performance benefits beyond greasy soil removals.

Preparation of polymerized Corn Oil Panels. Corn oil soils were prepared onto 3×5-inch stainless steel (304 grade) panels by lightly coating corn oil using a 2-inch polyurethane brush. The panels are rectangular flat sheets of stainless steel to simulate the surface of vertical surfaces surrounding grilling equipment where vaporized grease collects and coats. Protecting coating is removed from the coupons before they are cleaned, rinsed and any residue removed before the coupons are dried. The panels were coated with the polymerized corn oil. They were coated evenly to ensure no streaks of bare steel remained and any excess oil was removed using only the weight of the brush. Approximately 0.12 g+/−0.01 g corn oil was applied to the coupon.

Panels were then placed on an aluminum tray and cooked in a preheated 375° F. oven for approximately 20 minutes (rotating the tray at 10, 15 and 20 minutes) until the polymerized oil was no longer tacky and exhibited a light amber color. After approximately 10 minutes of cooking the oil begins to polymerize and thicken and smoke evolves from the oil. The tray is rotated to ensure panels were evenly heated in oven. The coupons were then allowed to cool overnight at ambient temperature, and placed on a rack with the coated side angled down to reduce any dust accumulation. The coupons are cured after resting for 24 hours at room temperature before testing with the Control and Acidic Composition.

Figure 1B:
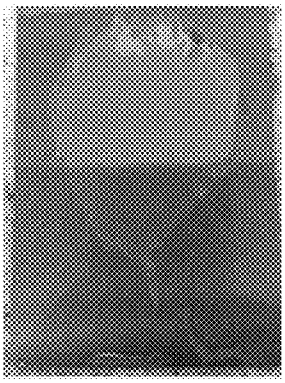
Figure 1C:
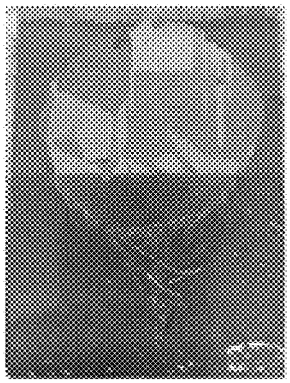

A first test comparing the various Acidic Compositions dropped onto coupons using a pipet measured the time in seconds for the cleaning composition to penetrate the corn oil soil on the coupons. FIG. 1A shows the efficacy of formic acid; FIG. 1B shows the efficacy of citric acid; and FIG. 1C shows the efficacy of gluconic acid-containing Acidic Compositions. All three formulations showed at least similar efficacy to a Control. Importantly the measured time to penetrate and remove the corn oil (i.e., degreasing) was less than 1 minute for all acidic formulations as shown in FIGS. 1A-1C.

Figure 2A:
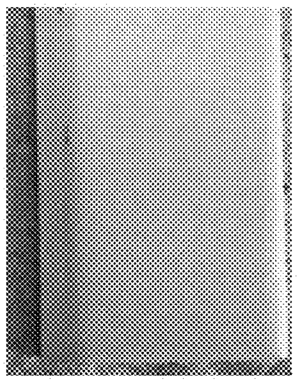
FIGS. 2A-2C show photographs of a soak test using Acidic Compositions containing formic acid (FIG. 1A), citric acid (FIG. 1B), and gluconic acid (FIG. 1C) on stainless steel coupons for efficacy in time to completely remove corn oil soil on the coupons as described in Example 1.
Figure 2B:
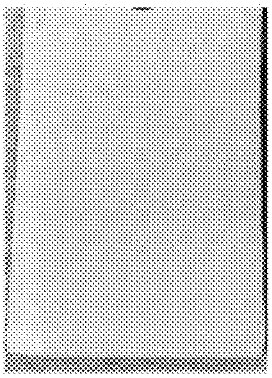
Figure 2C:
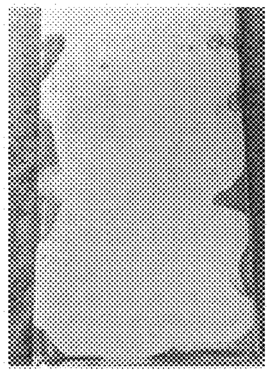

A second test compared the various Acidic Compositions for a soaking application of the chemistries onto the coupons. The coupons were submerged into a test solution of the chemistry being evaluated and the amount of time required for complete soil removal was measured. The efficacy of the compositions is shown in FIGS. 2A-2C where a 1-minute soak time removed the polymerized corn oil.

Example 2

Figure 3:
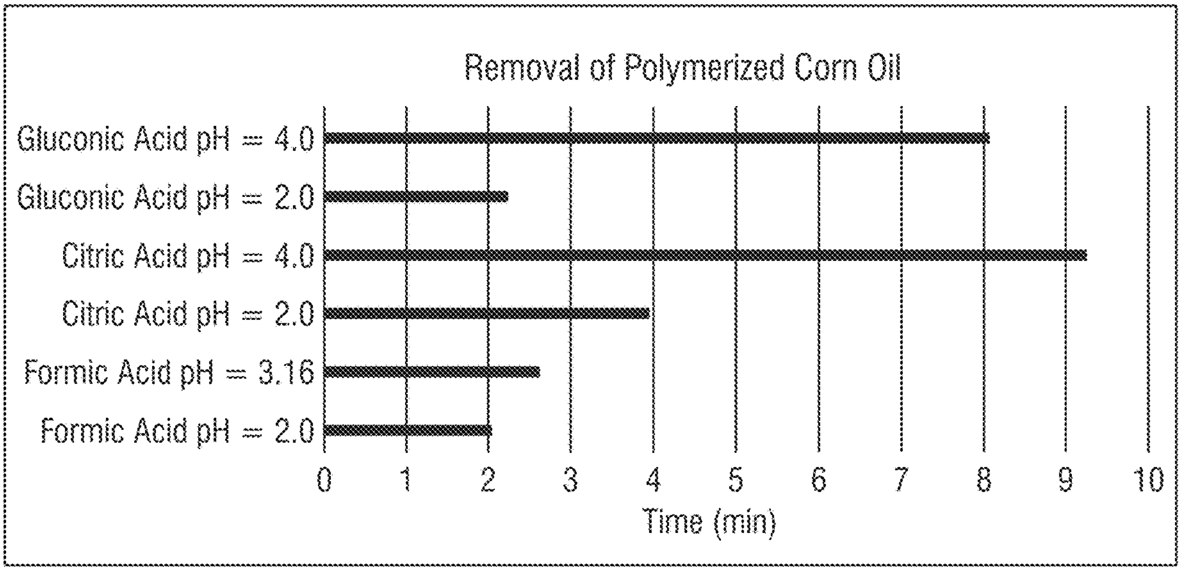
FIG. 3 shows a graph of the speed of removal of polymerized corn oil soils from coupons as described in Example 2.

Additional testing of the Acidic Compositions to remove polymerized corn oil from coupons was completed. The methodology of Example 1 for the polymerized corn oil soils was used with the chemistry dropped onto the coupons and pH was adjusted using MEA. The coupons were contacted with the various Acidic Compositions at pH between 2-4 to assess the impact of pH on corn oil removal, namely the speed of removal. The efficacy of the compositions is shown in FIG. 3, showing that the lower pH formulations provide faster penetration and removal of the polymerized corn oil soils from the coupons. The pH of 3-4 provide complete removal, however, for spot treatments where contact time is as minimal as possible before an application, such as a ware wash application, the Acidic Compositions having a pH <4 may be preferred.

Example 3

Methods for assessing tea-stained tile cleaning performance were performed using the Alkaline Compositions compared to Control (as outlined in Example 1). The testing of the Citric Acid Compositions against tea stains demonstrates ability to treat and remove one of the hardest stains in the warewash process. The composition of tea is complex with oxidized polyphenols (tannins) bridged by calcium silicates in its structure of the stain on a surface. The evaluated method is used to create the stain on white ceramic tiles and then try to remove it by using a standard automated dish machine with a known concentration of detergent. Performance is evaluated by comparison between sets of tiles using both visual and image manipulation methods.

Initially, tiles were washed in standard dish machine with a highly alkaline detergent containing a high concentration of chelants. Cycles on the dish machine are run until the tiles are fully clean. Tiles are then ready to be soiled.

To prepare tiles for testing, a tea bath was filled with 17 grain hard water and heated to 180° F. using a steam line. 150 Lipton black tea bags were added and agitated for about 5 minutes. The tea bags were removed while squeezing the liquid out of them into the broth. The temperature in the bath was then decreased to about 155-160° F. Then the airline leading to the tea bath was turned on. A set of tiles was added to a rack in a dipper so that the tiles were dipped 25 times for a period of 1 minute each time in the solution and 1 minute out of solution for each dip. If necessary, deionized water was added to the dipper to replace any water loss by evaporation. The tiles were then allowed to air dry for 3 days (or baked in an oven at 180° F. for 2 hours before testing).

To assess the ability of Citric Acid Compositions to better remove soil, stained tiles were submerged into beakers of various cleaning compositions. Before the tiles were washed, the amount of soil on the tiles was noted by taking pre-cleaned pictures and visual assessments of the tiles. Beakers of test solutions were prepared as the concentrate RTU (no further dilution). The solutions were stirred at 100 rpm. The tea-stained tiles were dipped into the respective beaker for 30 seconds, 1 minute, and 2 minutes. Thereafter the tile was visually analyzed and then quantified using imaging software to assess the cleanliness of the tile.

Figure 4:
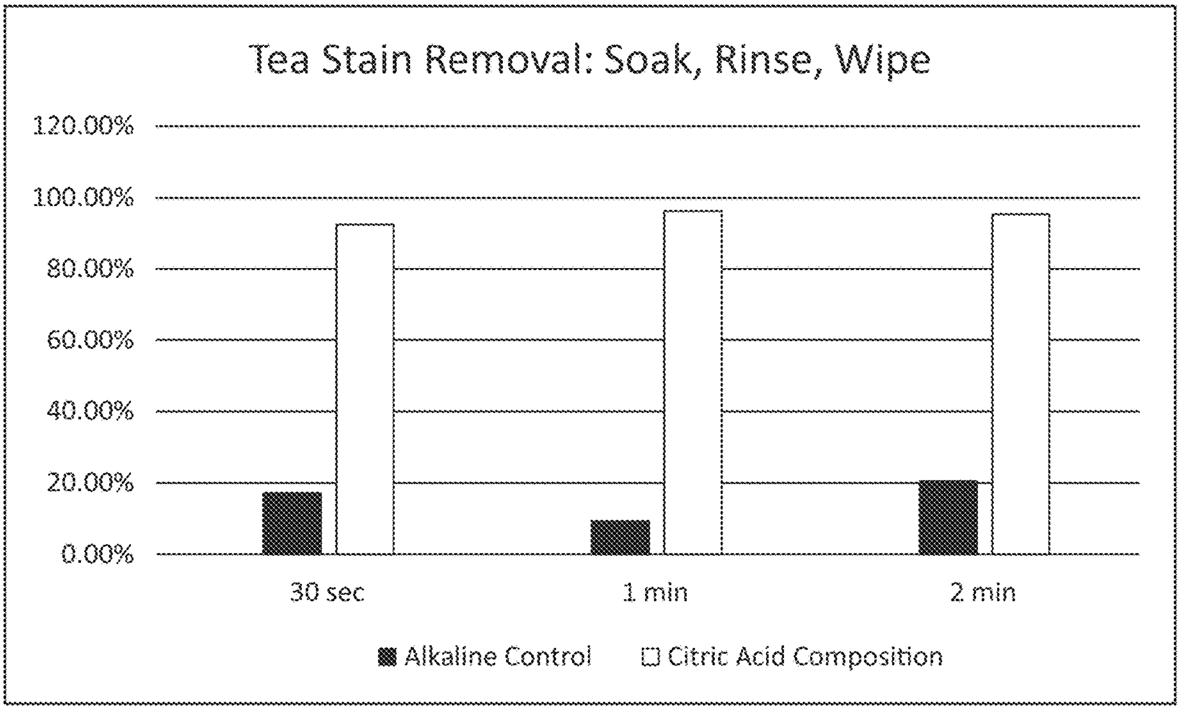
FIG. 4 shows a graph of tea stain removal efficacy of a Control formulation (alkaline degreaser composition) compared to an Acidic Composition containing citric acid following a 30 second, 1 minute and 2-minute soak as described in Example 3.

The Alkaline Control versus Citric Acid Composition efficacy is shown on FIG. 4 along with the % removal measurements shown in Table 4 and again summarized in Table 5.

TABLE 4

| Treatment | Soak time | initial | final | % removal |
|---|---|---|---|---|
| Alkaline Control | 30 sec | 75 | 77.9 | 17.06% |
| Citric Acid Composition | 30 sec | 69.4 | 90.3 | 92.48% |
| Alkaline Control | 1 min | 74.7 | 76.3 | 9.25% |
| Citric Acid Composition | 1 min | 73.7 | 91.3 | 96.17% |
| Alkaline Control | 2 min | 75.9 | 79.2 | 20.50% |
| Citric Acid Composition | 2 min | 77.1 | 91.3 | 95.30% |

TABLE 5

| Treatment | 30 sec | 1 min | 2 min |
|---|---|---|---|
| Alkaline Control | 17.06% | 9.25% | 20.50% |
| Citric Acid Composition | 92.48% | 96.17% | 95.30% |

The test results show that the Citric Acid Composition performs substantially better than the Alkaline Control.

Example 4

Mechanical degreasing efficacy of the various Acidic Compositions compared to the acidic Control, Alkaline Control (as outlined in Example 1) and a negative control (DI water) was assessed using red and black soils. The preparation of and testing for each of red and black soils is described.

Black Soil Preparation. A black soil including about 50 grams mineral spirits, about 5 grams mineral oil, about 5 grams motor oil, about 2.5 grams black pigment dispersion and about 37.5 grams bandy black clay was prepared. A plurality of 3"×3" white vinyl tiles were soiled on the back, grooved side with approximately 0.75 grams of the black test soil using a 3" foam brush. The tiles were allowed to dry at room temperature overnight. The next day, the tiles were placed into a soaking tray containing about 200 grams of the cleaning compositions for about 2 minutes.

Red Soil Preparation. A red soil consisting of lard, oil, protein, and iron (III) oxide (for color) was prepared. About 30 grams of lard was combined with about 30 grams of corn oil, about 15 grams of whole powdered egg, and about 1.5 grams of $Fe_2O_3$. The back, grooved sides of a plurality of 3"×3" white vinyl tiles were soiled with approximately 0.75 grams of the red soil using a 3" foam brush. The tiles were allowed to dry at room temperature overnight. It is believed that this incubation period allowed the bonds holding the triglycerides and proteins together in the soil to begin to crystallize and interlink. The next day, the tiles were placed into a soaking tray containing about 200 grams of a test composition for about 1 minute.

The soil removal test was conducted using a Precision Force Applicator (PFA), available from Precision Analytical Instruments, Inc., using a synthetic sponge. The PFA is similar to the Gardner Straightline Apparatus except that it is interfaced with a computer to control various parameters, such as, for example speed, number of repetitions, time between cycles, etc. The synthetic sponge was pre-dampened with water with the excess water squeezed out and then saturated with about 50 grams of the test compositions. The tiles were then placed into the PFA with the grain of the tiles parallel to the direction of sponge travel. For red soil tiles, the tiles were scrubbed with about 2 pounds of pressure with the moistened synthetic sponge for 16 cycles, rotating the tiles 90 degrees every 4 cycles for a complete 360-degree rotation of the tiles. For black soil tiles, the tiles were scrubbed with about 2 pounds of pressure with the moistened synthetic sponge for 40 cycles, rotating the tiles 90 degrees every 10 cycles for a complete 360-degree rotation of the tiles. In both cases, the tiles were then rinsed with city water and dried overnight at room temperature. Hunter Lab L* reflectance of the soiled tiles and washed tiles were measured. The soiled tiles L* reflectance value is represented by the following equation:

$$\text{soiled } L^* = \frac{1}{3.38\ \ln\left(\frac{92.1 - 24.74}{\text{soiled } L* - 24.74}\right)}$$

where 3.38, 92.1, and 24.74 are constants. The washed tiles L* reflectance value is represented by the following equation:

$$\text{washed } L^* = \frac{1}{3.38\ \ln\left(\frac{92.1 - 24.74}{\text{washed } L* - 24.74}\right)}$$

The percent soil removal was then calculated as:

$$\text{percent soil removal} = \left(\frac{\text{soiled } L^* - \text{washed } L^*}{\text{soiled } L^*}\right) * 100$$

Figure 5:
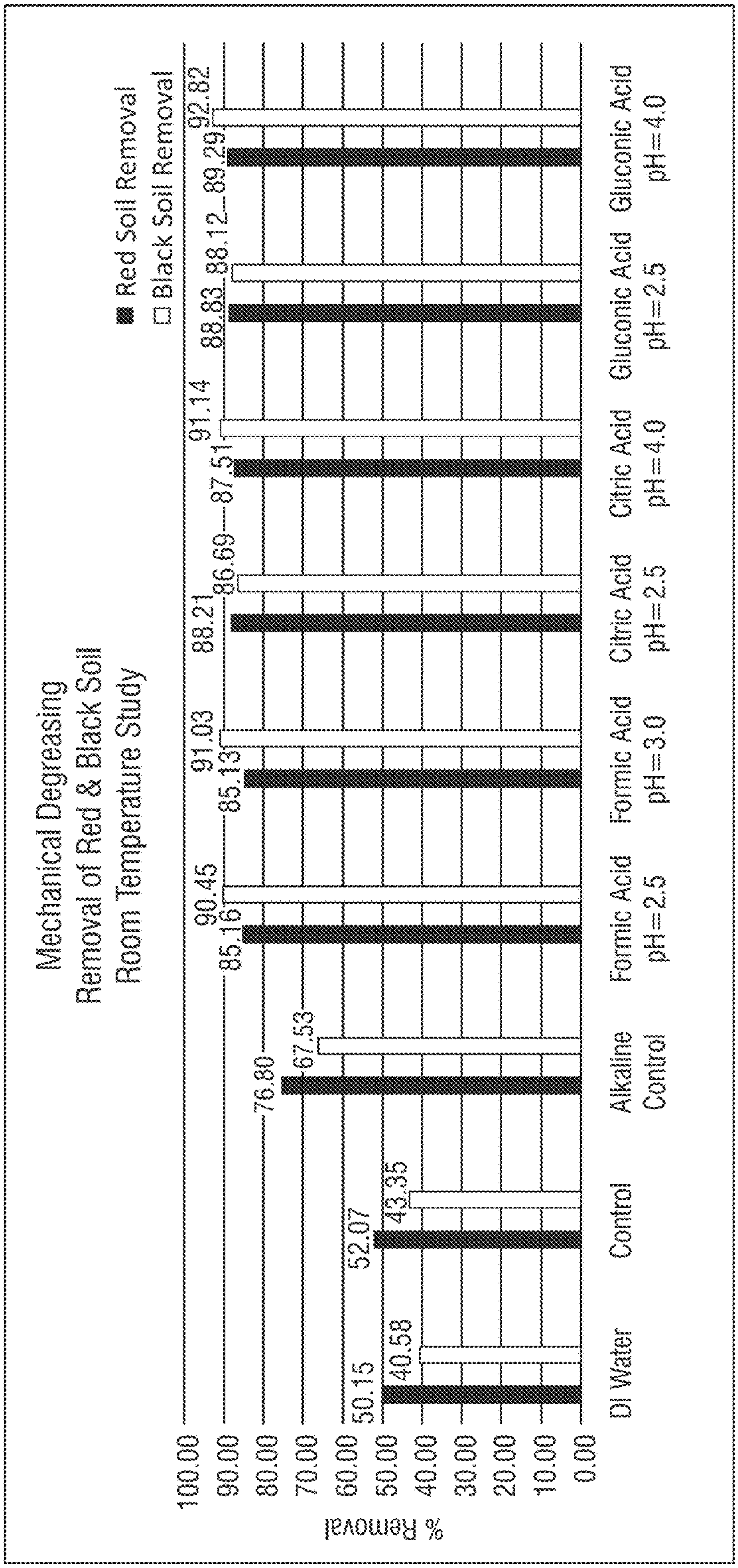
FIG. 5 shows a graph of red and black soil removal by a Control formulation compared to various Acidic Compositions as described in Example 4.

The Control versus Acidic Compositions efficacy results are shown on FIG. 5 with performance of the Acidic Compositions surpassing the Alkaline Control (as well as DI water as a negative control).

Example 5

Soap Scum removal efficacy of a Formic Acid composition and a Citric Acid composition was compared to an Alkaline Control composition, an Acidic Control composition, and water. The formulas for the compositions utilized are shown in Tables 2-3.

Soap Scum Soil Preparation. Soap scum soil was prepared by mixing approximately 82 grams of DI water, 1.5 grams of casein protein, 3 grams of Ivory brand soap, 0.40 grams Crisco, 0.30 grams Kalin clay, and 12.8 grams of a hardness solution containing calcium and magnesium chloride and sodium bicarbonate. This mixture was adjusted to a pH of 8.75. Approximately 0.50 grams of the prepared soap scum soil was spread onto a plurality of glass slides and allowed to dry. After drying, the slides were baked for 30 minutes at 200° C., and then allowed to cool.

The soil removal test was conducted using a Gardner Straightline Apparatus with a synthetic sponge. The synthetic sponge was saturated with about 300 grams of the test compositions, wrung out, and then 25 grams of the test composition was applied to one side of the sponge. The slides were then placed into the Gardner and sprayed lightly with the test composition. The test composition was allowed to dwell on the slide for 30 seconds. The slides were then scrubbed with about 2 pounds of pressure with the moistened synthetic sponge for 15 cycles. The slides were then rinsed with DI water and dried overnight at room temperature.

Figure 6:
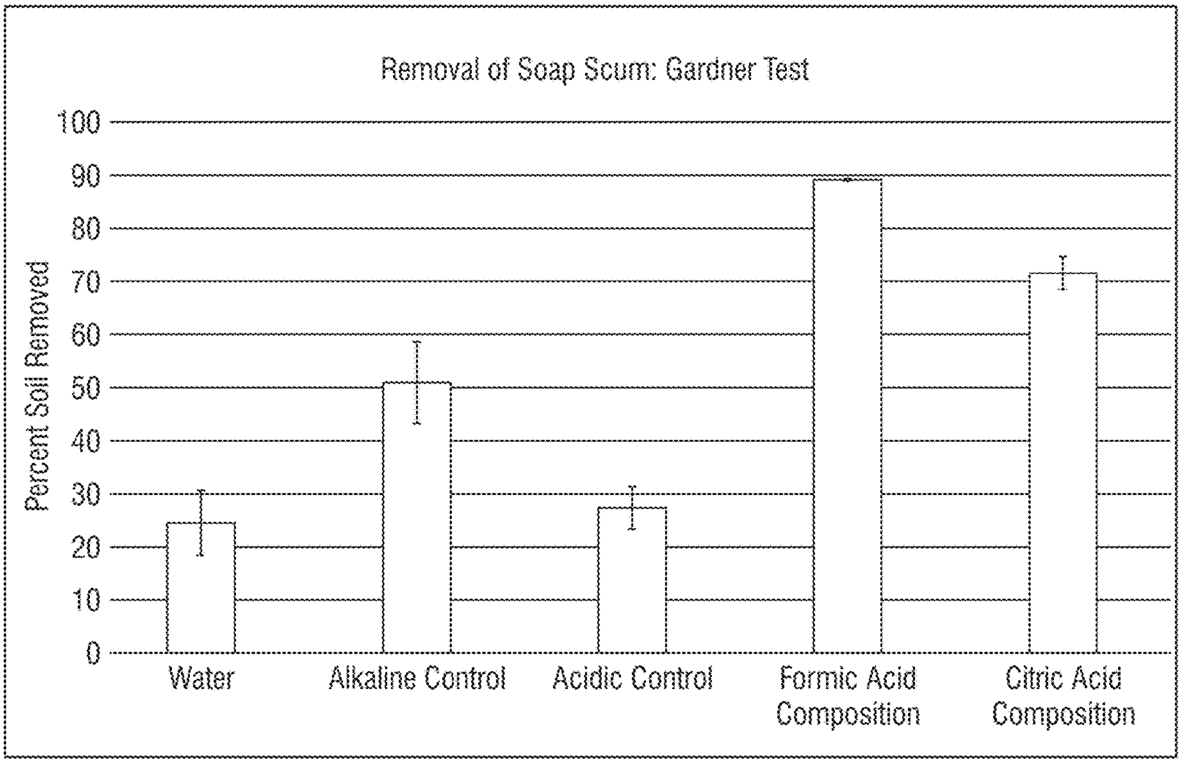
FIG. 6 shows a graph of soap scum removal by the Control formulations compared to various Acidic Compositions as described in Example 5.
Figure 7A:
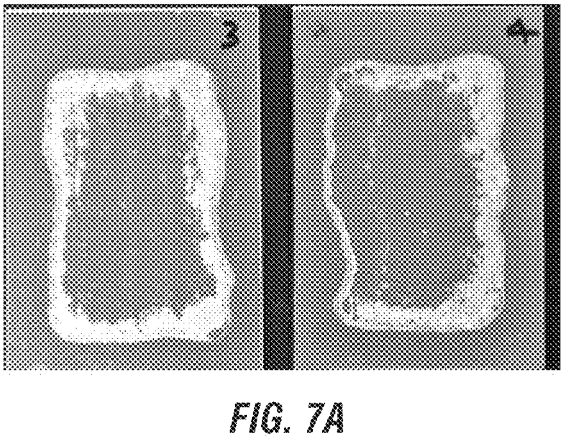
FIGS. 7A-7E show photographs of soap scum removal from glass slides using Acidic Compositions containing formic acid (FIG. 7A) and citric acid (FIG. 7B), an Acidic Control (FIG. 7C), an Alkaline Control (FIG. 7D), and water (FIG. 7E) as described in Example 5.
Figure 7B:
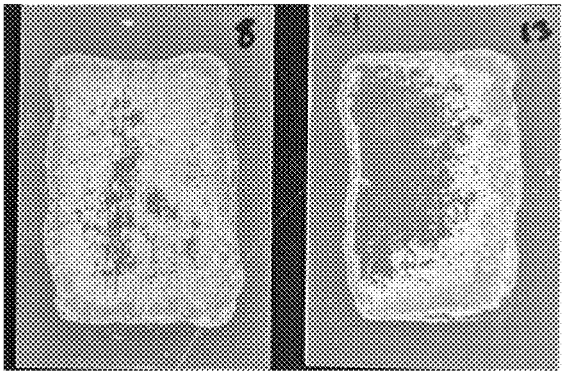
Figure 7C:
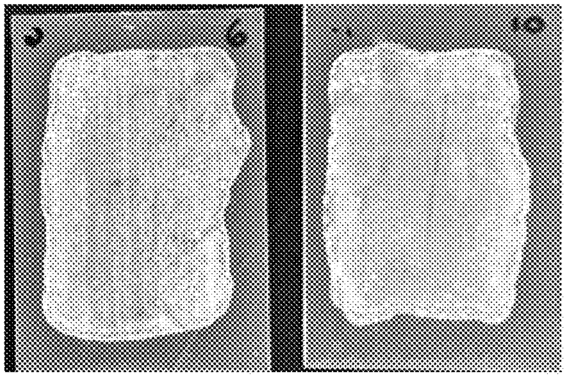
Figure 7D:
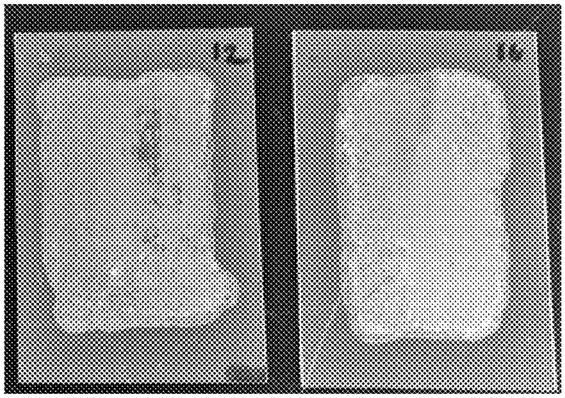
Figure 7E:
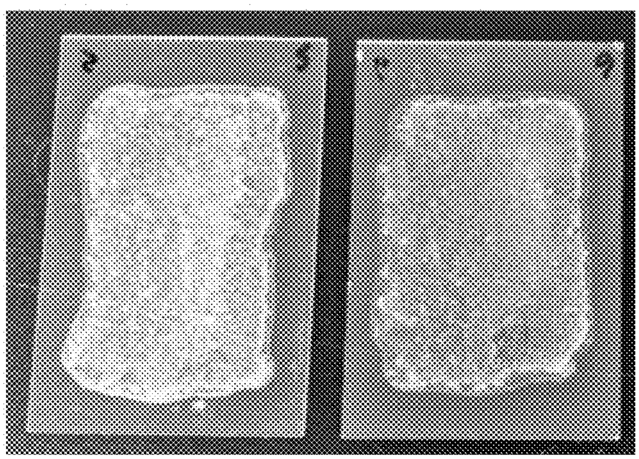

Percent soil removed, by weight, was then determined. A graph of percent soil removal by composition is depicted in FIG. 6. Visual images of the glass slides after the soil removal test are shown in FIGS. 7A-7E. As shown in FIG. 6 and FIGS. 7A-7E, the Formic Acid composition and the Citric Acid composition perform substantially better that the Alkaline Control, the Acidic Control, and water.

Example 6

Spot treatment efficacy of the Citric Acid and Formic Acid compositions according to the invention was compared to a control composition of water. The formulations for the acidic compositions are according to Table 2. The water used is 5 gpg water.

Tea-stained tiles were prepared according to the procedure described in Example 3. The tiles were sprayed with the test compositions and the compositions were allowed to dwell on each tile for one minute (i.e., a presoak). Then the tiles were washed in a Hobart AM-15 dishwashing machine in a single cycle with 10 drops of a commercially available alkaline detergent composition (60-100 wt-% sodium hydroxide, Alkaline Detergent) using 5 gpg water, and a regular, non-foaming trigger spray.

Figure 8A:
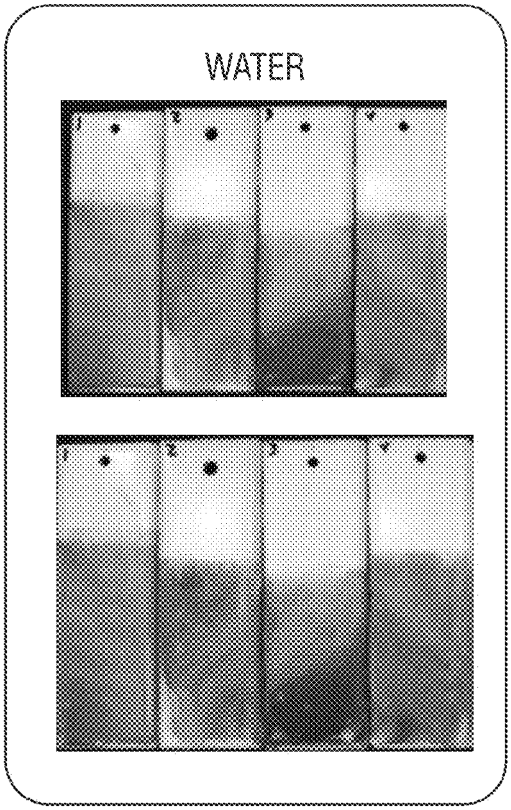
FIGS. 8A-8B show photographs of stain removal using spot treatments containing water (FIG. 8A) and citric acid (FIG. 8B) as described in Example 6.
Figure 8B:
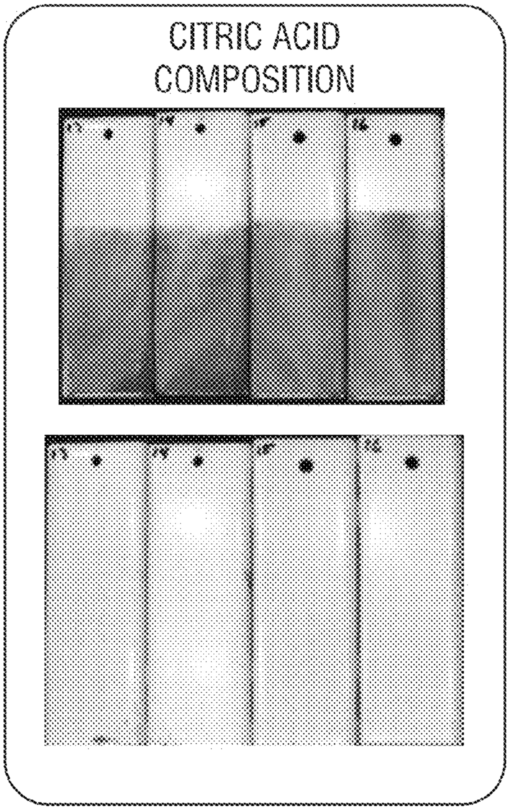

Photographs were taken of the tiles before and after the wash. The Citric Acid composition outperformed water. The Citric Acid composition removed significantly more of the soil, as shown by comparing FIG. 8A (water) and 8B (Citric Acid Composition).

Figure 9A:
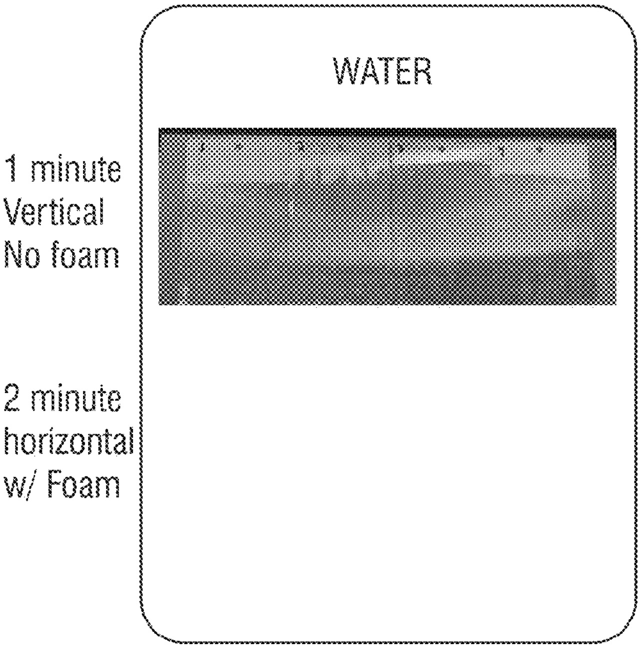
FIGS. 9A-9B show photographs of polymerized corn oil removal using spot treatments containing water (FIG. 9A) and citric acid (FIG. 9B) as described in Example 6.
Figure 9B:
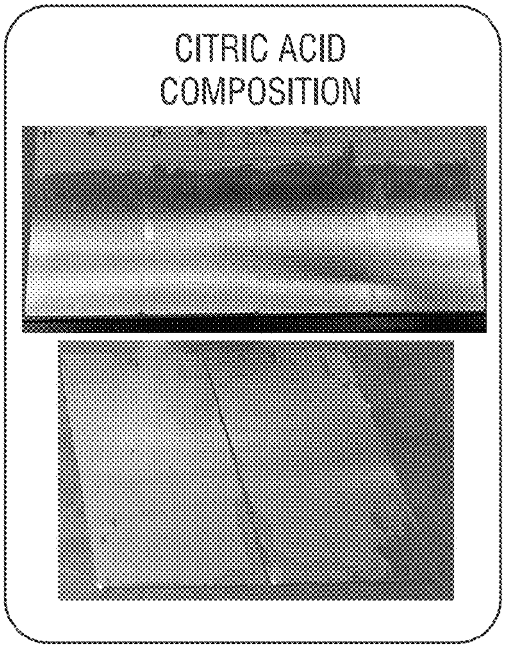

Similar testing was done to compare spot treatment for polymerized corn oil soil removal. Panels soiled with corn oil were prepared as outlined in Example 1. The panels were sprayed with either the Citric Acid composition or water and each was allowed to dwell on the panel for one to two minutes. Panels were either sprayed with a non-foaming sprayer with 1 minute of dwell time wherein the panels were oriented vertically, or the panels were sprayed with a foaming trigger sprayer and oriented horizontally. The panels were then washed in a Hobart AM-15 dishwashing machine in a single cycle with 10 drops of Alkaline Detergent and 5 gpg water. Photographs of the panels were taken after the cleaning was complete. The Citric Acid composition removed a significant amount of the polymerized corn oil with a two-minute treatment, as shown in FIG. 9B.

Figure 10A:
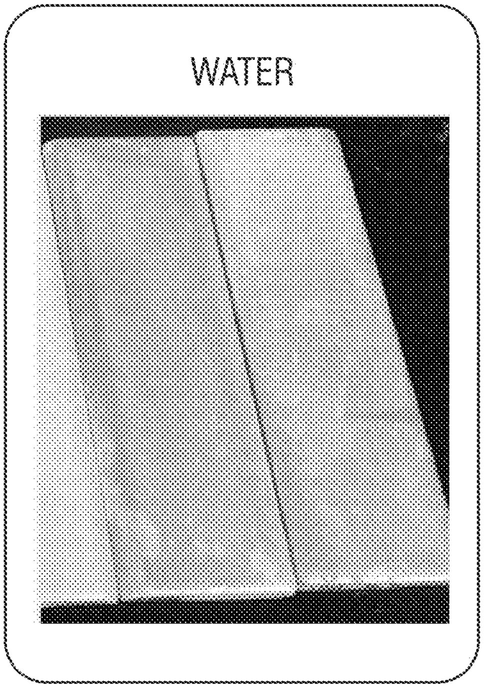
FIGS. 10A-10B show photographs of protein removal using spot treatments containing water (FIG. 10A) and citric acid (FIG. 10B) as described in Example 6.
Figure 10B:
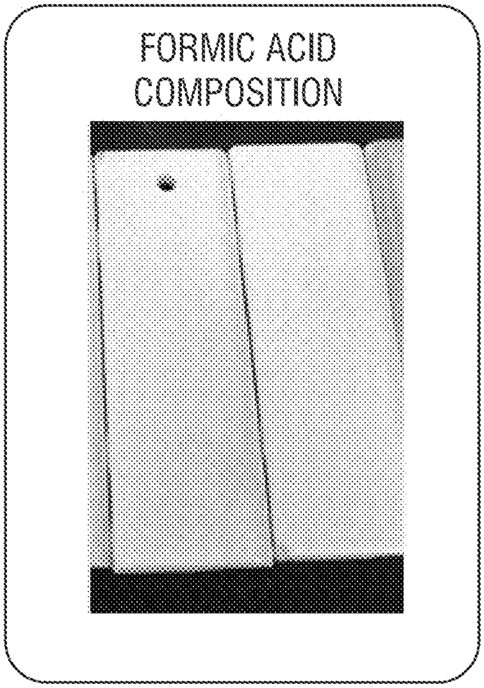

Similar testing was done to compare spot treatment for protein removal. Soil preparation. The panels were sprayed with either the Formic Acid composition or water and each was allowed to dwell on the panel for one minute. The panels were then washed in a Hobart AM-15 dishwashing machine for 10 cycles using 10 drops of Alkaline Detergent and 5 gpg water. Photographs were taken of the panels after cleaning in the dishwashing machine. The Formic Acid composition outperformed the control formulation as shown in FIGS. 10A and 10B.

Figure 11:
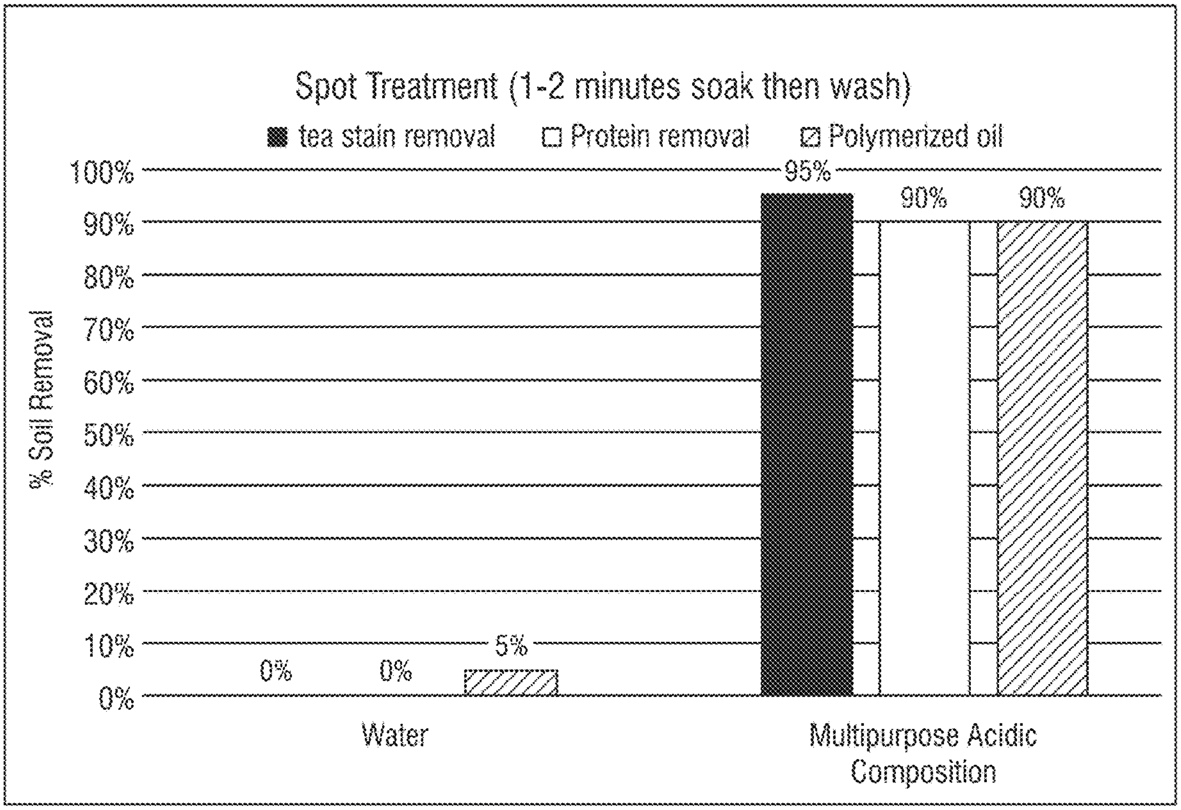
FIG. 11 shows a graph of tea stain removal, protein removal, and polymerized corn oil removal by spot treatment of the Acidic Compositions compared to a water control as described in Example 6.

For each of the tests outlined in this Example, percent soil removed was calculated. A graph of the results is shown in FIG. 11. As demonstrated in FIG. 11, the Acidic Compositions outperform the water control spot test for each type of stain and soil.

It is to be understood that while the invention has been described in conjunction with the detailed description thereof, the foregoing description is intended to illustrate, and not limit the scope of the invention, which is defined by the scope of the appended claims. Other embodiments, advantages, and modifications are within the scope of the following claims. In addition, the contents of all patent publications discussed supra are incorporated in their entirety by this reference.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A multipurpose composition comprising:

from about 3 wt-% to about 10 wt-% of citric acid;

from about 1 wt-% to 2.5 wt-% of an alkylbenzene sulfonate anionic surfactant;

from 8 wt-% to about 15 wt-% of benzyl alcohol; and from about 75 wt-% to about 90 wt-% water;

wherein the composition has a pH between about 2.5 and about 4, wherein the composition does not comprise any of the following: a betaine surfactant, a sulfobetaine surfactant, an amine oxide surfactant, and an additional sanitizing agent.

2. The composition of claim 1, wherein the pH of the composition is between about 3 and about 4.

3. The composition of claim 1, further comprising a hydrotrope.

4. The composition of claim 1, wherein the anionic surfactant is linear alkylbenzene sulfonate, and further comprising a hydrotrope, and wherein the composition has a pH between about 3 and about 4 and does not require use of personal protective equipment (PPE).

5. A method of cleaning and/or degreasing comprising:

applying to a surface or object in need of cleaning and/or degreasing the acidic composition according to claim 1;

removing soils, stains, and/or hard water deposits from the surface or object, and wherein the application of the composition does not require use of personal protective equipment (PPE).

6. The method of claim 5, wherein the applying to the surface or object is a multipurpose spot treatment, wherein the cleaning benefits are degreasing, de-liming and de-staining.

7. The method of claim 5, wherein the soils comprise a polymerized soil, carbonized soil, baked on soil, other fat soils, or combinations thereof.

8. The method of claim 5, wherein the composition is applied to the soiled surface or object for an amount of time from about one second to about 1 hour.

9. The method of claim 5, wherein the applying to the surface or object is a pre-treatment before the object is placed into a ware washing machine or a sink, and before cleaning with a detergent composition.

10. The method of claim 5, wherein the soil is on a food processing equipment, an environmental surface, or equipment used during food preparation, healthcare surface, or textile or laundry substrate surface.

11. The method of claim 5, wherein the surface is a floor.

12. The method of claim 5, wherein the cleaning and/or degreasing further removes hard water deposits, soap scum, rust, or combinations thereof from the surface or object.

* * * * *